Oct. 11, 1966   J. B. STENERSON   3,277,792
TURBINE
Filed July 6, 1964   3 Sheets-Sheet 1
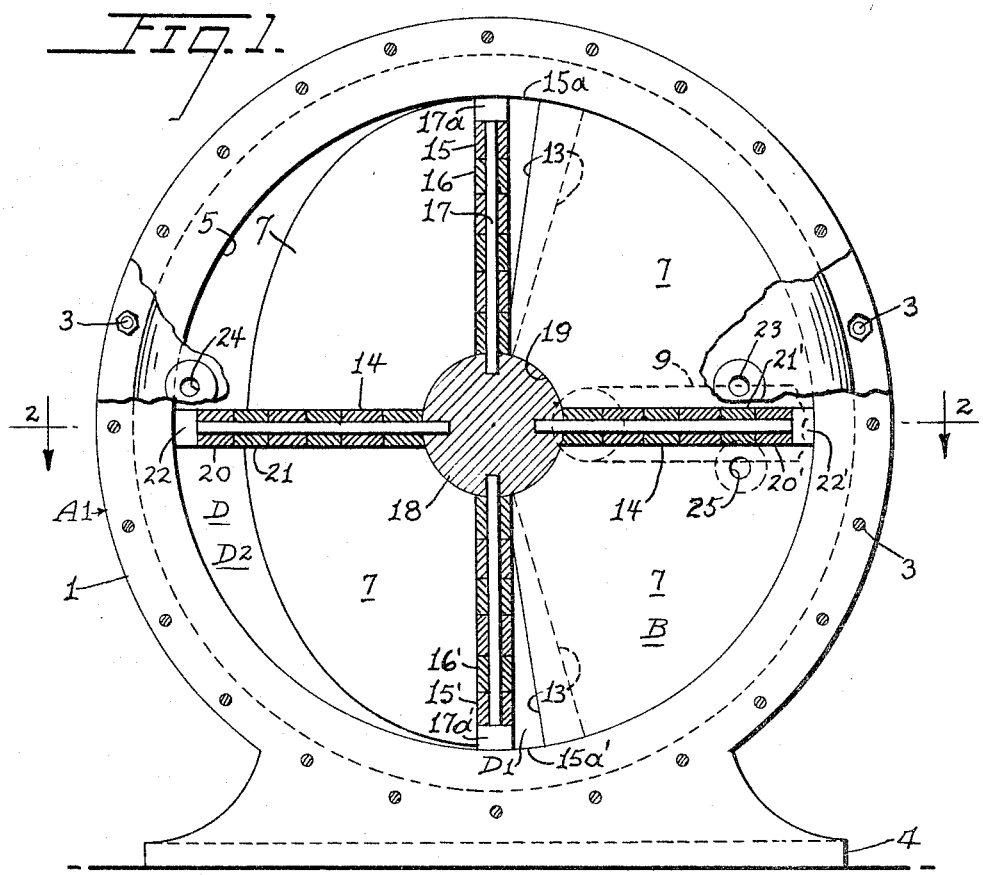
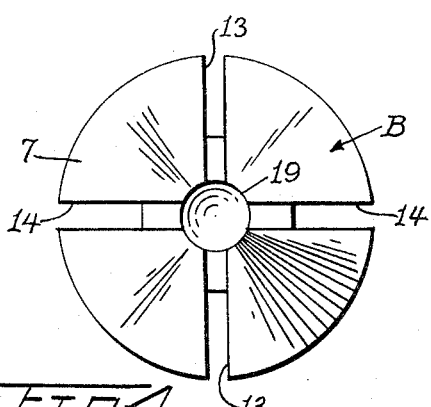
INVENTOR
JOHN B. STENERSON
BY William R. Piper
ATTORNEY Oct. 11, 1966   J. B. STENERSON   3,277,792
TURBINE Filed July 6, 1964   3 Sheets-Sheet 2

INVENTOR
JOHN B. STENERSON
BY William R. Piper
ATTORNEY

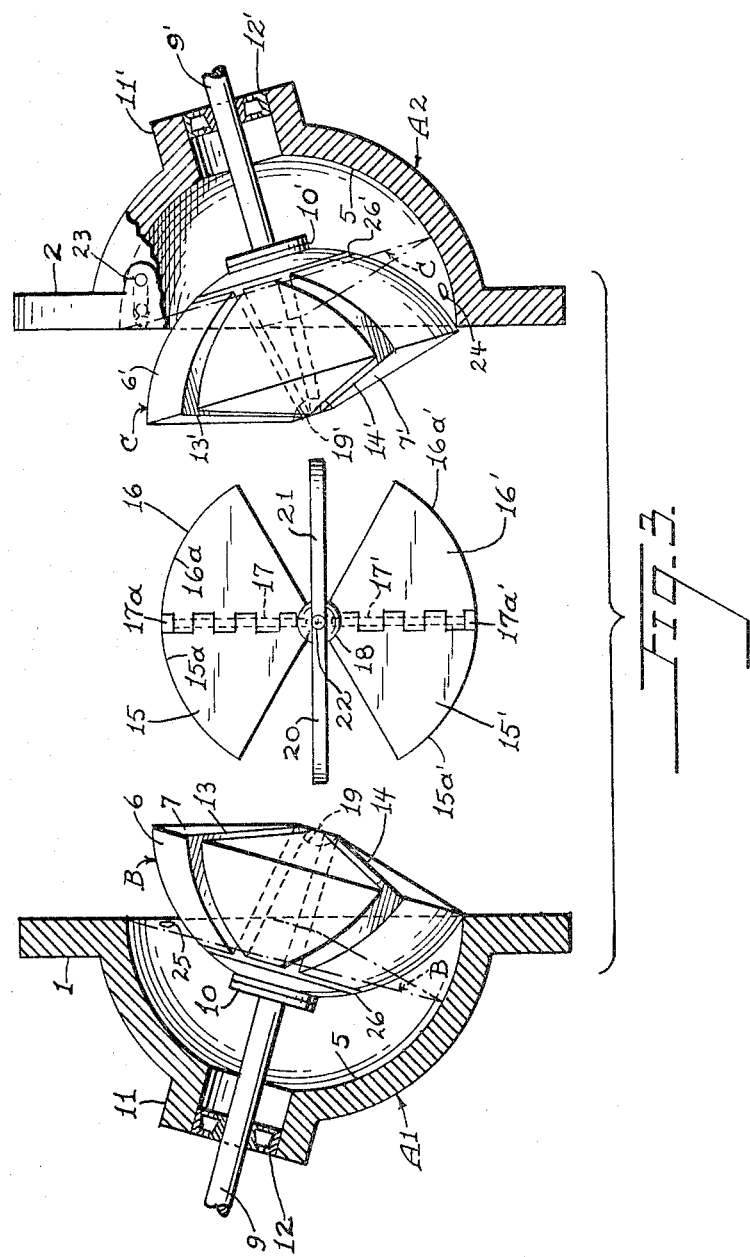

United States Patent Office 3,277,792
Patented Oct. 11, 1966

3,277,792
TURBINE
John B. Stenerson, 216 National St., Santa Cruz, Calif.
Filed July 6, 1964, Ser. No. 380,539
2 Claims. (Cl. 91—85)

The present invention relates to improvements in a turbine, and it consists in the combination, construction and arrangement of parts as hereinafter described and claimed.

An object of my invention is to provide a turbine that can operate on steam or any other gaseous medium under pressure. The turbine comprises a spherical-shaped housing formed from two hemi-spherical halves. These two halves are provided with circular flanges that are held together by bolts or other suitable fastening means.

Within the housing are mounted two rotatable members that have spherical portions which contact the inner spherical surface of the housing. Each rotatable member also has a conical portion. The axes of the rotatable members are inclined with respect to each other so that the conical portions will only contact each other along a radial line that extends from the center of the spherical housing. Each rotatable member has an integral power take-off shaft that projects outwardly from the center of the spherical portion. The housing has thrust bearings for rotatably receiving the shafts and the shafts project beyond the spherical housing wall and can be used for doing any work desired.

The two rotatable members are interconnected by hinged vanes that are slidably received in radially extending slots provided in the members. Each rotatable member has two pairs of radially extending slots, the slots of each pair lying in a single plane that extends through the central axis of the member, this axis coinciding with the shaft axis. The planes of the pairs of slots extend at right angles to each other and the slots extend inwardly from the outer surfaces of the conical and spherical portions of the members. The vanes are in the shape of sectors and radially-extending pivot pins hingedly connect opposed edges of adjacent pairs of vanes together. The inner ends of the pivot pins are welded to a central ball that in turn is received in two spherical cavities provided at the apexes of the conical portions.

The two shafts are slightly inclined with respect to each other and so are likewise the spherical and conical portions of the rotatable members. This will cause the conical portions to form a wedge-shaped steam or gas-receiving compartment in the housing and between said rotatable members. The pairs of hinged vanes extend across this wedge-shaped compartment and divide it into pockets. The spherical housing has an inlet port for delivering gas or steam under pressure into the pocket disposed nearest to the reduced end of the wedge-shaped compartment. This pocket will be small in capacity because of its being disposed near the reduced end of the compartment. However, as the steam or gas enters this pocket, it will press against the pair of vanes bounding this pocket and will move the vanes and the moving vanes will rotate both members as the pressure of the steam or gas enlarges the pocket. This enlarging of the pocket will continue as the members are rotated and the pair of vanes move into the larger portion of the wedge-shaped compartment.

This pocket when reaching its largest capacity will communicate with an exhaust port in the spherical housing and the gas or steam under pressure will escape through this exhaust port. At the same time atmospheric air will be drawn into the pocket through the exhaust port to relieve any vacuum that might have been formed in the pocket. This air will have a cooling effect on the working parts. A succession of gradually enlarging pockets will be rotated past the inlet port for receiving gas or steam and successive pairs of vanes will be acted upon by the gas or steam to rotate the members at a high speed. The pockets are formed by the vanes.

The members will rotate substantially through an arc of 180° from the time a pocket receives gas or steam from the inlet port and finally exhausts it through the outlet or exhaust port. Also the members will rotate through the remaining arc of about 180° from the time an expanded pocket receives any atomspheric air from the exhaust port to relieve any vacuum in the pocket until the pocket communicates with a second exhaust port in the housing that is placed near the inlet port and exhausts the compressed air through the second exhaust port. The inclining of the shafts at an angle to each other will cause the vanes in each pair to swing about their pivot pins into various angular positions as the vanes are carried around the shaft axes by the rotating members.

Other objects and advantages will appear as the specification continues. The novel features of the invention will be set forth in the appended claims.

Drawings

For a better understanding of my invention, reference should be made to the accompanying drawings, forming part of this specification, in which:

FIGURE 1 is a vertical transverse section through the turbine and is taken along the line 1—1 of FIGURE 2. One of the hemi-spherical housing halves has been removed in FIGURE 1.

FIGURE 3 is a sectional view on a smaller scale and shows the various parts of the turbine partially disassembled in order to illustrate the working parts more clearly.

FIGURE 4 is an end view of one of the rotatable members without showing the pairs of hinged vanes in the radially extending slots.

Figure 2:
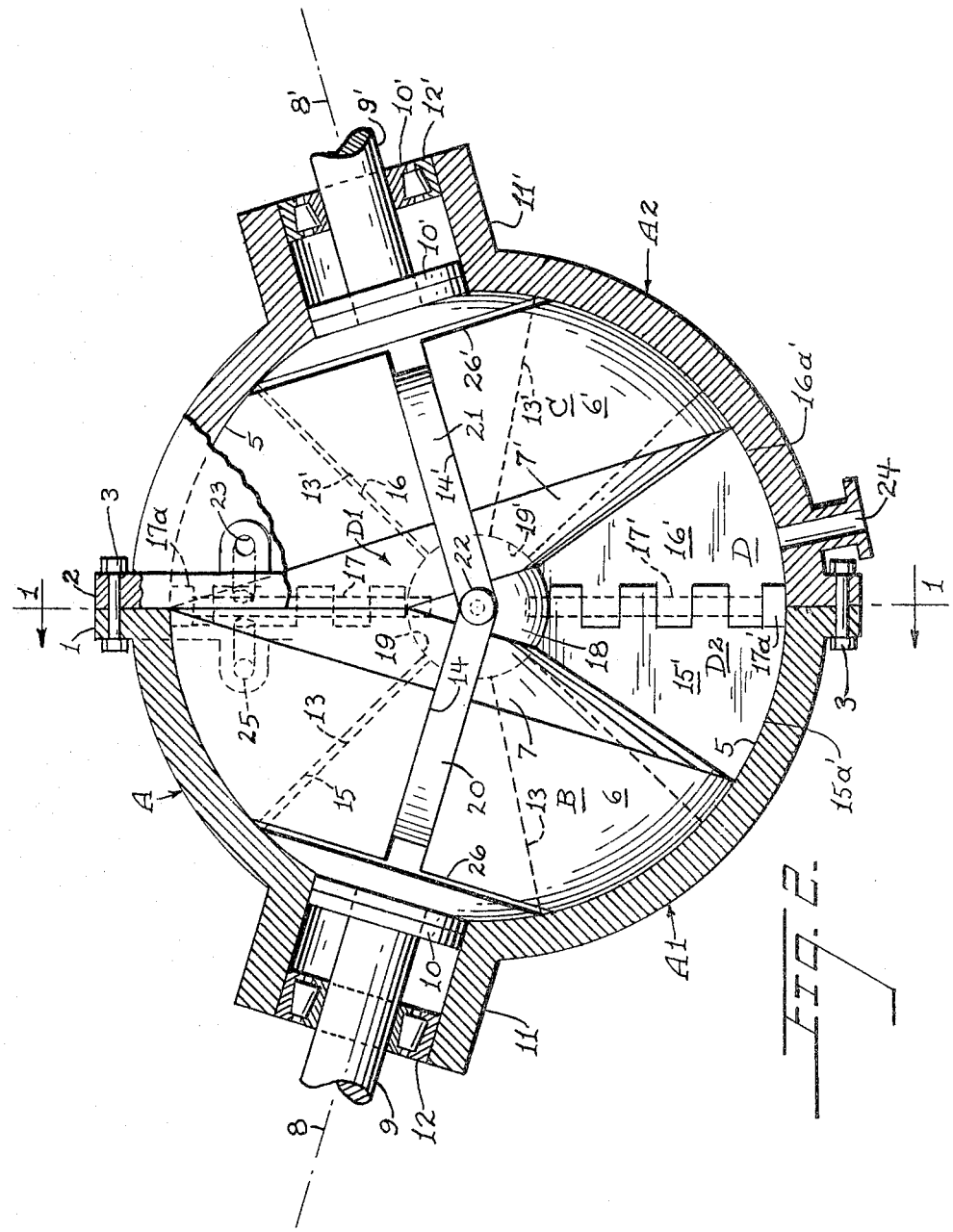
FIGURE 2 is a horizontal section through the turbine and is taken along the line 2—2 of FIGURE 1. The two output shafts of the turbine are shown inclined slightly with respect to each other.

While I have shown only the preferred form of my invention, it should be understood that various changes, or modifications, may be made within the scope of the annexed claims without departing from the spirit thereof.

Detailed description

In carrying out my invention, I provide a turbine that has a spherical housing A, composed of two hemi-spherical halves A1 and A2. The half housing A1 has a circular flange 1 and the half housing A2 has a circular flange 2. The two halves are secured together by bolting the two flanges 1 and 2 to each other with bolts 3, see FIGURE 2. The housing A has a base 4 for supporting it, see FIGURE 1. I do not wish to be confined to any particular type of housing A, because different types can be used. The housing must have a spherical-shaped inner wall 5.

Within the housing A, I rotatably mount two identical rotating members B and C, see the exploded view in FIGURE 3. Since both rotatable members B and C are identical, a detailed description of one will suffice for both and like reference numerals will be applied to similar parts except that the numbers for the rotatable member C will be primed. The member B has a spherical portion 6 and a conical portion 7. The axis 8 of the rotatable member B is inclined as shown in FIGURE 2 so that the conical surface 7 will have a radial portion lying tangent to a plane that lies between the abutting faces of the circular flanges 1 and 2.

This means that the other rotatable member C will have its conical surface 7' with a radial portion that will have a radial line contact with the other conical surface 7 of the rotatable member B. Before stating the purpose for this it is best first to continue with the description of the rotatable member B. A shaft 9 is rigidly connected to or is integral with the spherical portion 6. The axis of the shaft 9 is centered on the spherical portion 6 and coincides with the axis 8 of the rotatable member B. The axis 8 extends radially from the center of the spherical inner wall 5 of the housing A and it is inclined at a slight angle with respect to the axis 8' for the rotatable member C. In FIGURE 2, I show the two inclined axes 8 and 8' lying in the same horizontal plane. It is possible to have this common plane for both axes 8 and 8' to extend at any angle desired other than horizontal.

The shaft 9 is rotatably carried by a thrust bearing indicated generally at 10 and the latter is mounted in a cylindrical portion 11 of the housing half A1 as shown in FIGURE 2. A second bearing such as a tapered roller bearing 12 may be mounted in the cylindrical portion 11 for giving additional support to the shaft 9. The shafts 9 and 9' extend beyond the cylindrical portions 11 and 11' and are used as work or power take-off shafts.

FIGURES 1 and 4 show the spherical portion 6 and conical portion 7 provided with four radially extending slots arranged in pairs 13—13 and 14—14. FIGURE 3 shows a pair of sector-shaped vanes 15–16 hinged together by a pivot pin 17. This pin 17 has its inner end welded into a socket provided in a central ball-shaped member 18. The ball 18 is received in spherical sockets 19 and 19' provided at the apexes of the conical portions 7 and 7'. The pin 17 has a head 17a that holds the sector-shaped vanes 15 and 16 from moving outwardly away from the ball 18 due to centrifugal force when the turbine is operating. The outer arcuate edges 15a and 16a, therefore, cannot gouge into the inner spherical wall 5 during the rotation of the turbine vanes. The vane 15 is slidably received in the slot 13 in the rotatable member B and the vane 16 is slidably received in the slot 13' in the other rotatable member C.

In like manner FIGURE 3 shows a top end view of another pair of sector-shaped vanes 20–21 that are hinged together by a second pivot pin 22. The pin 22 has its shank, not shown in FIGURE 3, welded into a socket, not shown, provided in the ball-shaped member 18. The plane of the vanes 20 and 21 extends at right angles to the plane of the vanes 15 and 16. The vane 20 is slidably received in the slot 14 in the rotatable member B, and the vane 21 is slidably received in the slot 14' in the rotatable member C.

There are two additional pairs of sector-shaped vanes used. The vanes 15' and 16', see FIGURE 3, are disposed opposite to the vanes 15 and 16 and are disposed on the central ball 18 at 180° from the pair of vanes 15 and 16. A pivot pin 17' hingedly connects these two vanes 15' and 16' together. The fourth pair of sector-shaped vanes in FIGURE 3 are hidden by the pair of vanes 20 and 21 shown in the same figure. They can be seen in FIGURE 1 at 20' and 21'.

FIGURE 2 shows the vanes 20 and 21 slidably received in the slots 14 and 14' in the rotatable members B and C, respectively. The members have been rotated 45° from the positions shown in FIGURE 3 and the vanes 20 and 21 are shown in end elevation. The two vanes also extend at an angle with respect to each other and have pivoted about their hinge pin 22. It will be seen from FIGURE 2 that the angles of the shaft axes 8 and 8' cause the cone-shaped portions 7 and 7' of the members B and C to form a wedge-shaped compartment. The vanes 20 and 21 divide a portion of this compartment into a smaller pocket D1 and a larger pocket D. The smaller pocket D1 has less capacity than the larger pocket D2 but as the members B and C rotate the smaller pocket D1 will enlarge to the same size as the pocket D2.

The housing A has an intake port 23, see FIGURE 2, that communicates with the smaller pocket D1. Steam or gas under pressure is directed into the intake port 23 and will fill the pocket D1 formed by portions of the cones 7 and 7' and by the exposed portions of the pair of vanes 20 and 21 that extend from the pivot pin 22 to the slots 14 and 14' provided in the rotatable members B and C. The steam or gas under pressure will press against the exposed portions of the vanes 20 and 21 and will move them away from the intake port 23. This vane movement will cause the members B and C to rotate on their axes 8 and 8' and the pocket D1 will move and will be enlarged.

Eventually the smaller pocket D1 will move into the position formerly occupied by the larger pocket D2 and the larger pocket will start to reduce in capacity. When the expanding pocket D1 reaches its fully expanded position, it will communicate with an exhaust port 24 and the steam or gas will escape from the pocket and into the atmosphere through this exhaust port. By this time another pocket formed by other pairs of vanes and by portions of the cones 7 and 7' will be in communication with the intake port 23 and will receive steam or gas under pressure. In this way a continuous rotation is imparted to the rotating members B and C.

When the steam or gas exhausts from an enlarged pocket D2 and passes through the exhaust port 24 to the atmosphere, a partial vacuum may be formed in the pocket. Atmospheric air will rush into the pocket by way of the exhaust port 24 to eliminate the vacuum. This air will have a cooling effect on the walls of the pocket. As soon as the pocket passes out of registry with the exhaust port 24, the air in the pocket will be trapped and compressed as the pocket gets smaller because the pocket is traveling toward the intake port 23.

Before the pocket is completely collapsed, which occurs when the two conical portions 7 and 7' contact each other at their point of tangency, the collapsing pocket communicates with a second exhaust port 25 in the housing A and shown by dotted lines in FIGURE 2. Any trapped and compressed air will escape through this second exhaust port. As soon as any pair of vanes 15–16 or 20–21 or 15'–16', etc., pass the line of tangency between the two cones 7 and 7', a new pocket will start to be formed. While this pocket is small in capacity, it will communicate with the intake port 23 to receive a new supply of of steam or gas under pressure and the cycle will be repeated.

The slots 13 and 14 are interconnected by grooves 26, see FIG. 2, so as to prevent any air from being trapped between the edges of the vanes received in the slots and the bottoms of the slots. Grooves 26' in the rotatable member C interconnect the slots 13' and 14' in this member and prevent any trapping of air in the slots.

I claim:
1. A turbine comprising:
   (a) a housing having a spherical inner wall;
   (b) a pair of identical members rotatably mounted in said housing, each having a spherical portion for contacting with the inner wall of said housing and having a conical portion;
   (c) each member having a shaft extending from the center of the spherical portion, the conical and spherical portions as well as the shaft of each member having a common axis, the axes of the two members being inclined at an angle to each other so that the conical portions of both members will contact with each other along a radial line from the center of said housing;
   (d) the conical portions of the members cooperating with the spherical inner wall of said housing to form a compartment having a shape like a section of a sphere; said members having radially extending slots extending into the conical and spherical portions a predetermined distance;
   (e) pairs of hinged vanes with one vane of each pair being slidably received in a different slot in one member and the other vane of the same pair being slida- bly received in a cooperating slot in the other member, whereby the two members are interconnected by said pairs of vanes and said vanes move through said housing compartment when said members are rotated to form the compartment into a series of moving pockets that gradually increase in capacity from the radial line where the two conical portions lie tangent to each other to an angular point 180° removed therefrom and then gradually decrease in capacity through the next 180° of rotation of the members;

(f) said housing having an inlet port communicating with said compartment near to the radial line of tangency between the two conical-shaped portions so that steam or gas under pressure can enter said compartment and will expand against said vanes for moving them and rotating said members;

(g) said housing having an exhaust port communicating with said compartment substantially at said 180° point; and (h) said spherical portions of said rotating members having grooves that communicate with said slots for relieving the tapping of any air in said slots caused by the movement of said vanes into said slots during the rotation of said members.

2. The combination as set forth in claim 1: and in which (a) each pair of hinged vanes includes a pivot pin interconnecting the two vanes of the pair together; and (b) a central spherical member having the inner ends of said pins permanently connected thereto;

(c) said conical portions having recesses at their apexes for receiving and centering said spherical member.

References Cited by the Examiner

UNITED STATES PATENTS

| | | | |
|---|---|---|---|
| 763,963 | 7/1904 | Cobb | 91—82 |
| 763,982 | 7/1904 | Jahn | 91—82 |
| 764,464 | 7/1904 | Hendricks | 91—82 X |
| 764,465 | 7/1904 | Hendricks | 91—83 X |
| 769,082 | 8/1904 | Hendricks | 91—82 |
| 2,482,325 | 9/1949 | Davis | 103—117 X |

FOREIGN PATENTS

| | | |
|---|---|---|
| 128,447 | 1/1901 | Germany. |
| 173,242 | 10/1905 | Germany. |

MARTIN P. SCHWADRON, *Primary Examiner.*

SAMUEL LEVINE, *Examiner.*

A. S. ROSEN, *Assistant Examiner.*